United States Patent [19]
Webb et al.

[11] Patent Number: 6,119,219

[45] Date of Patent: *Sep. 12, 2000

[54] SYSTEM SERIALIZATION WITH EARLY RELEASE OF INDIVIDUAL PROCESSOR

[75] Inventors: Charles Franklin Webb, Poughkeepsie; Dean G. Bair, Bloomington; Mark Steven Farrell, Pleasant Valley; Barry Watson Krumm, Poughkeepsie; Pak-kin Mak, Poughkeepsie; Jennifer Almoradie Navarro, Poughkeepsie; Timothy John Slegel, Staatsburg, all of N.Y.

[73] Assignee: International Business Machines Corporation, Armonk, N.Y.

[*] Notice: This patent is subject to a terminal disclaimer.

[21] Appl. No.: 09/070,595

[22] Filed: Apr. 30, 1998

[51] Int. Cl.[7] .......................................................... G06F 9/00

[52] U.S. Cl. .......................... 712/227; 712/220; 712/230; 712/231

[58] Field of Search ................................ 712/41, 32, 227, 712/230, 231, 220

[56] References Cited

U.S. PATENT DOCUMENTS

| | | |
|---|---|---|
| 4,646,236 | 2/1987 | Crockett et al. . |
| 4,809,168 | 2/1989 | Hennessy et al. . |
| 4,901,233 | 2/1990 | Liptay . |
| 5,276,878 | 1/1994 | Sutton et al. . |
| 5,345,567 | 9/1994 | Hayden et al. . |
| 5,611,062 | 3/1997 | Webb et al. . |
| 5,621,909 | 4/1997 | Webb et al. . |
| 5,673,391 | 9/1997 | Webb et al. . |
| 5,694,617 | 12/1997 | Webb et al. ............................. 710/40 |
| 5,713,035 | 1/1998 | Farrell et al. . |
| 5,761,734 | 6/1998 | Pfeffer et al. ........................... 711/164 |
| 5,819,078 | 10/1998 | Farrell et al. ........................... 712/227 |

OTHER PUBLICATIONS

"Fast Parallel Processor Notification" IBM Technical Disclosure Bulletin, vol. 31, No. 4, Sep. 1988, pp. 48–52.

"Method For Spin Loop Detection" IBM Technical Disclosure Bulletin, vol. 32, No. 7, Dec. 1989, pp. 78–82.

"Sixteen–Bit Operating System Fast Safe RAM Semaphore Compatibilty In An Intel 80386 Paged Environment" IBM Technical Disclosure Bulletin, vol. 34, No. 4A, Sep. 1991, pp. 445–447.

"Efficient ESA/370 Read Channel Programming" IBM Technical Disclosure Bulletin, vol. 35, No. 5 Oct. 1992, pp. 107–115.

(List continued on next page.)

*Primary Examiner*—Richard L. Ellis
*Assistant Examiner*—Mackly Monestime
*Attorney, Agent, or Firm*—Lynn L. Augspurger

[57] ABSTRACT

A pipelined multiprocessor system for ESA/390 operations which executes a simple instruction set in a hardware controlled execution unit and executes a complex instruction set in a milli-mode architected state with a millicode sequence of simple instructions in the hardware controlled execution unit, comprising a plurality of CPU processors each of which is part of said multiprocessing system and capable of generating and responding to a quiesce request, and controls for system operations which allow the CPUs in the ESA/390 system to process the local buffer update portion of IPTE and SSKE operations without waiting for all other processors to reach an interruptible point, and then to continue program execution with minor temporary restrictions on operations until the IPTE or SSKE operation is globally completed. In addition, Licensed Internal Code (LIC) sequences are defined which allow these IPTE and SSKE operations to co-exist with other operations which require conventional system quiescing (i.e. all processors must pause together), and to allow for CPU retry actions on any of the CPUs in the system at any point in the operation.

13 Claims, 5 Drawing Sheets

OTHER PUBLICATIONS

"MSIS Handling S/370 Serialization In MSIS Without Delay" IBM Technical Disclosure Bulletin, vol. 36 No. 1, Jan. 1993, pp. 466–469.

"Multisequencing In A Single Instruction Stream Processing Of Parallel Streams" IBM Technical Disclosure Bulletin, vol. 37, No. 1, Jan. 1994, pp. 133–139.

"Serial Message Architecture" IBM Technical Disclosure Bulletin, vol. 38, No. 4, Apr. 1995, pp. 601–603.

"Token–Based Serialization of Instructions in a Multiprocessor System" by H. W. Tast et al., U.S. application No. 08/689,762, filed Aug. 13, 1996.

SYSTEM SERIALIZATION WITH EARLY RELEASE OF INDIVIDUAL PROCESSOR

CROSS REFERENCE TO RELATED APPLICATIONS

The present application is related to the co-pending U.S. patent application Ser. No. 09/070,429 filed Apr. 30, 1998 by the same inventors concurrently herewith entitled "Multiprocessor serialization with early release of processors".

This co-pending application and the present application are owned by one and the same assignee, International Business Machines Corporation of Armonk, N.Y.

FIELD OF THE INVENTION

This invention is related to computer multiprocessors and particularly to those multiprocessors systems having millimode operations and their system serialization with early release of individual processors when executing instructions such as the operations for Invalidate Page Table Entry (IPTE) and Set Storage Key Extended (SSKE).

BACKGROUND OF THE INVENTION

As we continue to develop CMOS implementations of the widely employed ESA/390 multi-processor system we are faced with the need to improve performance with a compatible design. The ESA/390 architecture includes several operations which must appear to occur at a single point in time as seen by all CPUs in a multi-processor system. These operations are primarily used to update storage access control information, which may in general be buffered within the CPUs to provide high-performance access to this information. That buffered information may in many cases be referenced multiple times within the execution of a single ESA/390 instruction on one CPU, and the ESA/390 architecture requires that certain changes to that information not appear to happen within an ESA/390 instruction.

The two operations which are used frequently enough to affect system performance are Invalidate Page Table Entry (IPTE) and Set Storage Key Extended (SSKE) and in order to improve performance we have developed a way of handling these operations more efficiently and thus can reduce system runtime of programs which employ these instructions. In the course of executing one of these instructions on a single CPU, the Dynamic Address Translation (DAT) path to a 4K block of virtual storage is made invalid (IPTE) or the storage key used to control access to a 4K block of real storage is changed (SSKE). These changes must be transmitted to all CPUs in the system as part of the execution of the instruction on the originating CPU.

A straightforward implementation of the ESA/390 architecture for these instructions is for the CPU executing the IPTE or SSKE to signal all other CPUs in the system to pause at a point between ESA/390 instructions, a quiesce point in the usual quiesce method used in the S/370 based systems. Once all CPUs have reached such a point, the system is said to be quiesced and the first CPU is free to update the translation table entry or storage key as needed. While the system is quiesced, the first CPU must also indicate the change being made to the other CPUs so that those other CPUs, along with the first CPU, can update or discard any buffered copies of the information being changed. Once all of these actions are complete, the first CPU signals the other CPUs that they may resume processing. This approach has been used on a number of S/370, 370/ESA, and ESA/390 implementations and thus may be called a 'quiesce method'.

Here, as an aside, we should note that a recent ESA/390 implementation was described in U.S. Ser. No. 08/689,762, filed Aug. 13, 1996, issued as U.S. Pat. No. 5,761,734 on Jun. 2, 1998 entitled "Token-based Serialization of Instructions in a Multiprocessor System" by inventors, H. W. Tast, U. Gaertner, K. J. Getziaff, and E. Pfeffer, assigned to International Business Machines Corporation, the assignee of this application. The invention described was used in an ESA/390 processor introduced commercially late in 1996 when performing instructions like IPTE (Invalidate Page-Table Entry) and SSKE (Set Storage Key Extended which modify the Tables in Memory that are commonly used by all the processors in order to perform address translations was described. There a token was used for serializing instructions like IPTE and SSKE which have had to be processed serially. After a request in response to a request of one of the processors the token is assigned to the requesting process which then has the right to execute one of said instructions. In case the instruction comprises several tasks, the token is locked until the last task of the instruction is executed. Then, the token is unlocked and can be assigned to another instruction. A processor can only execute one of the instructions that have to be processed serially if it possesses a token. When there is a need for serializing instructions that have to be processed serially in a multiprocessor system with this token apparatus, a first task can be only initiated on an initiating processor which can only execute the first task if it possesses a token, and in order to have a token assigned to one processor in case it is available, there must first be a request for the token by the initiating processor, and when it is available, the instruction can be executed serially, after which there is a need for returning the token after completing the first task of an instruction that has to be processed serially, with the token not necessarily becoming available for other processors. After completion of a serial task there must be a reestablishment of the availability of the token after completion of the instruction that has been processed serially.

A drawback to the required steps is that with the control of the process by the initiating processor and the complexity of token passing, there can be no system serialization with early release of individual processors in the ESA/390 system in the recently released CMOS processor version. While it would be possible to store the contents of an entry of an address translation table in separate registers and then invalidate the entry, until now, for the IPTE and SSKE instructions, the commercially implemented recognized alternative to the token process is when modifying an address translation table to wait until all processors have finished the execution until all processors have finished their current instruction, the quiesce method usually used in the other described System 370 based system, including earlier versions of the ESA/390 systems.

A chief drawback to waiting for all CPUs to quiesce (the quiesce method) is that the time required for a CPU to reach a point that is between ESA/390 instructions is highly variable due to the presence of complex and long-running instructions in the ESA/390 instruction set.

In a system with a large number of CPUs, the mean time until all CPUs in the system have reached such a point can grow large, and the net effect on system performance is compounded by the fact that all CPUs are waiting (doing no useful work) until the last CPU reaches such a point. This, and the amount of handshaking required among the CPUs, makes the performance of such an approach unattractive.

Another approach that has been used (e.g. on the ES/9000 9021) is to have the CPU executing the IPTE or SSKE first change the translation table or storage key, then signal all other CPUs to update or discard their buffered copies as soon as they reach a point between ESA/390 instructions. This is possible only if the CPU design is such that ESA/390 instructions can be completely nullified at any point prior to instruction completion. This requirement stems from the fact that the change to the translation table or storage key could cause a storage access exception condition to become apparent to another CPU before it has reached the end of the ESA/390 instruction it is currently executing. If in this case something else causes that CPU's buffered copy of the changing information to be discarded (e.g. replacement in a set-associative lookaside buffer) during that instruction, the CPU may see an access exception on an operand it had previously found to be accessible. If the ESA/390 instruction can still be nullified at this point, all is well, but if not then the CPU operation fails to satisfy the ESA/390 architecture. This approach has considerably better performance than the straightforward approach, but carries the requirement of nullifiability throughout the execution of ESA/390 instructions. In a CPU design that has this feature anyway (e.g. to support speculative or out-of-sequence execution), this is a reasonable design for IPTE and SSKE; the performance benefit for these instructions alone, however, could not justify adding this degree of complexity to a CPU design.

A form of the latter approach is also possible if the CPU design can guarantee that buffered copies of the relevant information cannot be lost during the course of an ESA/390 instruction. While it is not difficult to make this a rare event, making it impossible places a significant constraint on the CPU design, particularly given the ESA/390 Interpretive Execution architecture, which in some cases requires recursive DAT and allows intermediate translations to be kept in a Translation Lookaside Buffer (TLB).

An implementation of ESA/390 IPTE and SSKE operations is therefore desired which does not have the burdensome CPU design requirements of either of the latter two implementations, but which does not incur the performance overhead of the first implementation.

SUMMARY OF THE INVENTION

This invention introduces controls which allow the CPUs in an ESA/390 system to process the local buffer update portion of IPTE and SSKE operations without waiting for all other processors to reach an interruptible point, and then to continue program execution with minor temporary restrictions on operations until the IPTE or SSKE operation is globally completed. In addition, Licensed Internal Code (LIC) sequences are defined which allow these IPTE and SSKE operations to co-exist with other operations which require conventional system quiescing (i.e. all processors must pause together), and to allow for CPU retry actions on any of the CPUs in the system at any point in the operation.

This solution achieves performance close to, and in many cases equal to, the best known implementations, without imposing the requirements on the overall CPU design that the other high-performance designs require.

These and other improvements are set forth in the following detailed description. For a better understanding of the invention with advantages and features, refer to the description and to the drawings.

Figure 4A:
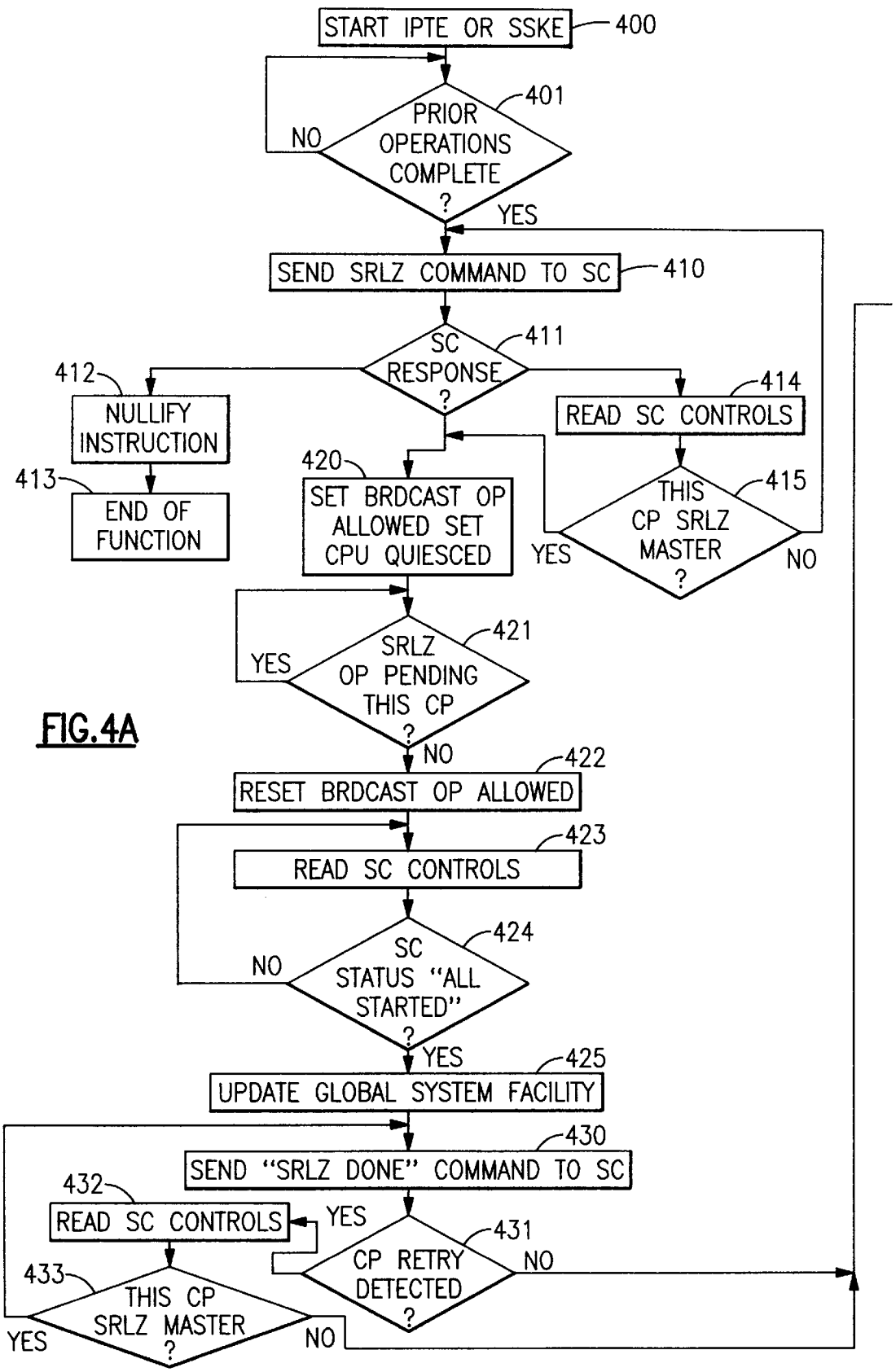
FIG. 4 is a flow diagram of a millicode routine for handling a quiescent operation for the Invalidate Page Table Entry (IPTE) and Set Storage Key Extended (SSKE) in which the local buffer portion is processed without waiting for all other processors to quiesce.
Figure 4B:
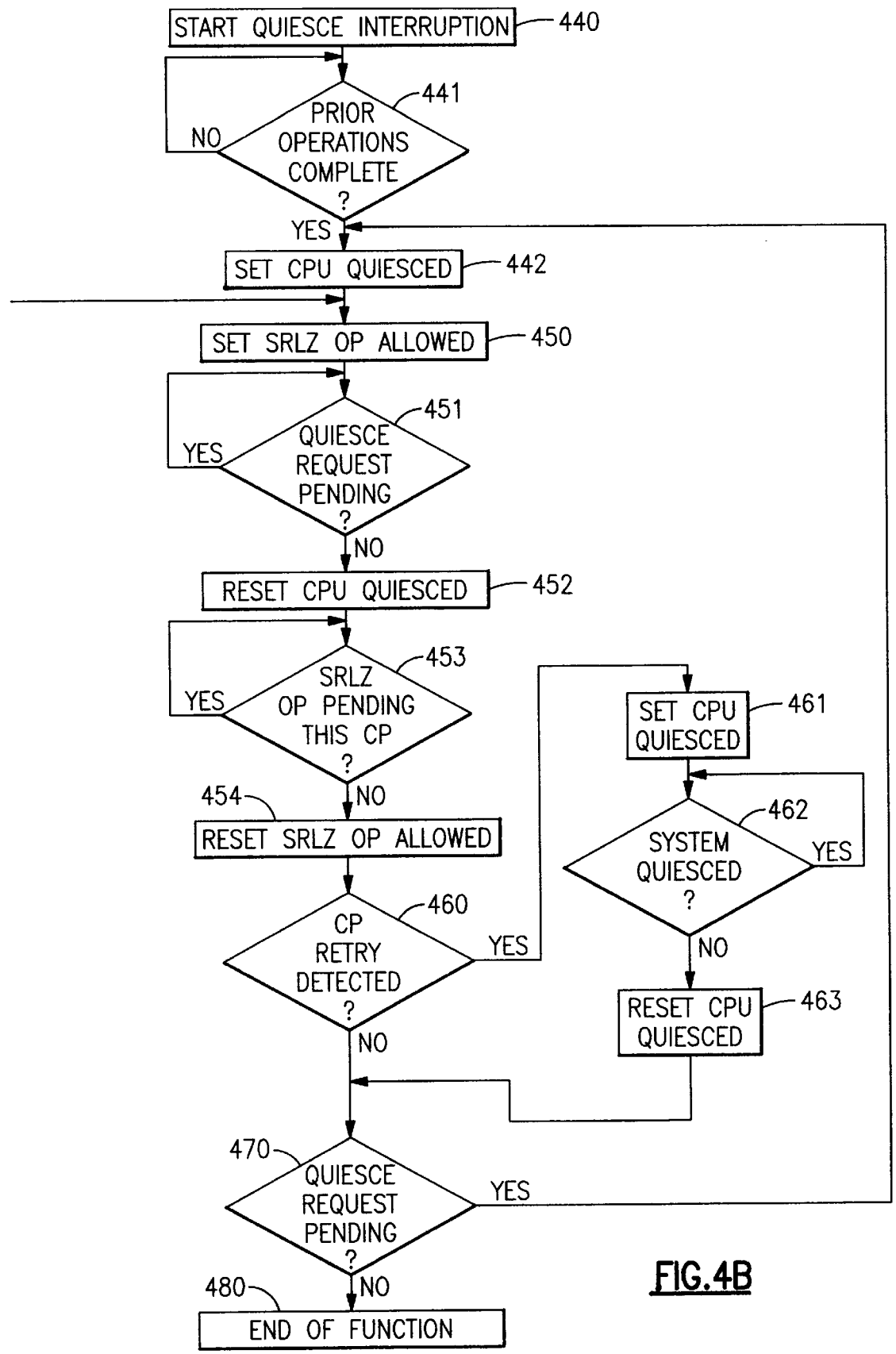

(Note: For convenience of illustration, FIGURE is may be separated in parts and as a convention we place the top of the FIGURE as FIG. 4A and FIG. 4B, where FIG. 4B begins with the start of Quiesce interruption, with the flow from FIG. 4A being input to the FIG. 4B flow after SET CPU QUIESCED 142.)

DETAILED DESCRIPTION OF THE INVENTION

Before considering our preferred embodiments in detail, it may be worthwhile to illustrate, by way of example, . . .

Figure 1:
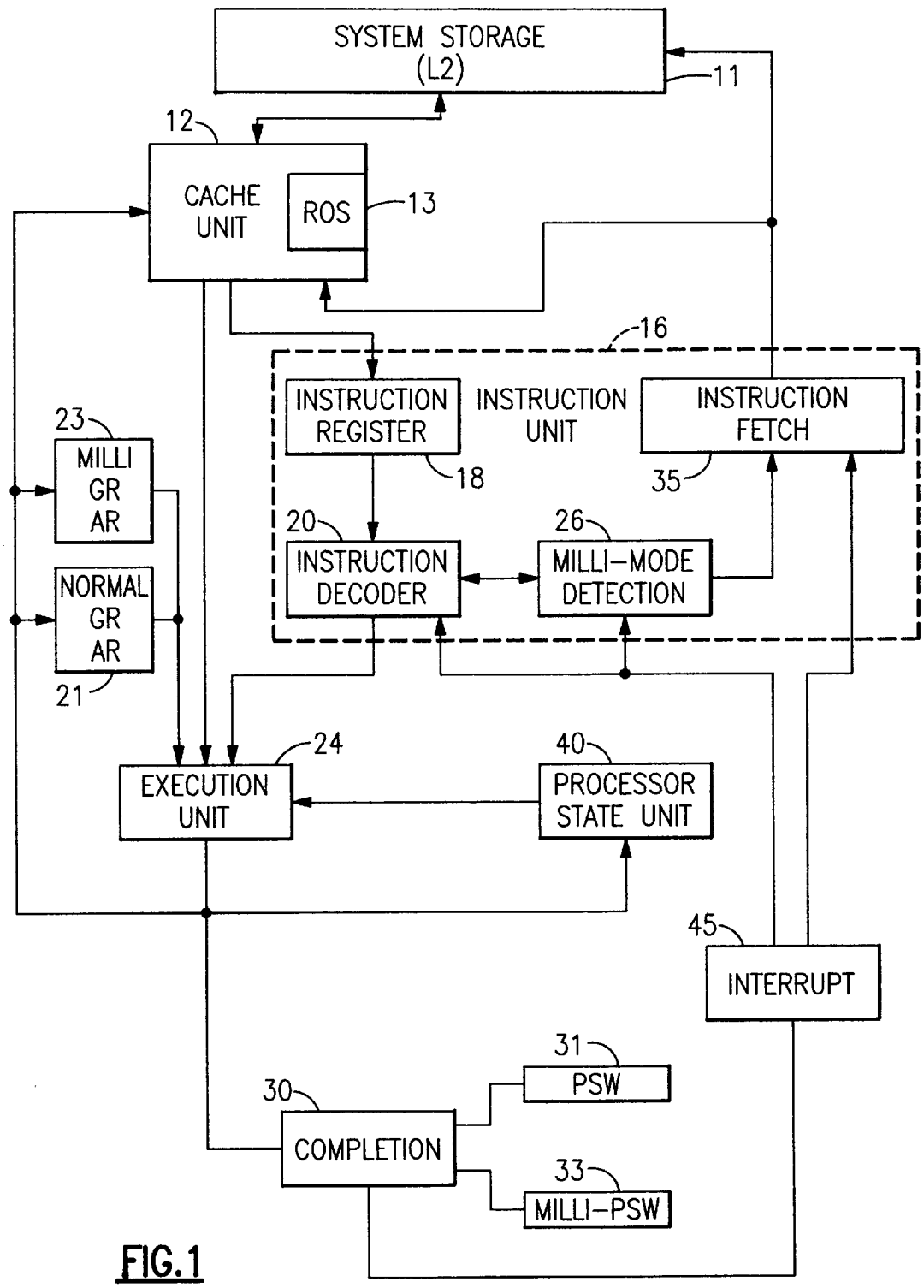
FIG. 1 shows schematically an overview of the preferred embodiment and particularly shows a block diagram illustrating the components of a millicode system in accordance with a preferred specific embodiment of the invention including our new controls.

Turning now to our invention in greater detail, it will be seen that we employ the hardware described in FIG. 1 in our preferred embodiment which is applicable in the overall context of a system generally conforming to IBM's Enterprise Systems Architecture/390 or ESA/390 S/390 system architecture (all trademarks of the assignee, International Business Machines Corporation, Armonk, N.Y., USA). An early detailed description of the conventional elements of such a 390 system processor can be found, for example, in U.S. Pat. No. 4,901,233 to John S. Liptay, assigned to the same assignee as the present invention, and incorporated by reference, in its entirety, as if printed in full below, as it was in U.S. Pat. No. 5,694,617 which describes the current quiesce method for millimode operations. The millimode operations useful in U.S. Pat. No. 5,694,617.

In the preferred implementation, the conventional quiesce sequence, including support for CPU retry occurring within the sequence, is as described in U.S. Pat. No. 5,694,617, issued Dec. 2, 1997, entitled "System for Prioritizing Quiesce Requests and Recovering from a Quiescent State in a Multiprocessing System with a Milli-mode Operation", by C. F. Webb et al, and the retry trap mechanism described in U.S. Pat. No. 5,673,391, issued Sep. 30, 1997, entitled "Hardware Retry Trap for Millicoded Processor", by C. F. Webb et al. The mentioned patents and their related ESA/390 applications are incorporated herein by reference, as illustrations of the use of milli-mode for a milli-coded processor. Multiprocessing system are applicable to our preferred embodiment while providing Invalidate Page Table Entry (IPTE) and Set Storage Key Extended (SSKE) operations without waiting for all other processors to reach a quiesce point where all processors pause together. Referring now to FIG. 1, elements of a system relevant to the quiesce operations used in this preferred system still include the basic elements previously described in U.S. Pat. No. 5,694,617 albiet with the changes we will introduce. Thus the overall system, as described in FIG. 1 provides for a hierarchical memory which will include a system storage 11 and some sort of a cache memory unit 12. The system storage 11 contains the instructions that the processor is executing as well as the data those instructions are manipulating. The cache memory unit 12, which includes a copy of the data and instructions the processor is presently executing, in this preferred embodiment is a split cache providing interleaved double word addressing. The cache memory 12 logically includes a contiguously addressable read only store 13, in which code for executing certain frequently invoked milli-mode routines is stored. An instruction unit subsystem 16 includes an instruction buffer (not shown in FIG. 1), instruction registers 18 and an instruction decoder 20. The instruction unit subsystem receives macro-instructions, millicode instructions, and data from the cache memory unit 12. Instructions are parsed and placed into the instruction registers 18. The decoder 20 reads the contents of the instruction registers 18, decodes the instruction (or causes an operation exception), and passes the instruction to an instruction queue for sequential execution by a hardware execution unit 24. Each hardware execution unit 24 has access to a set of general purpose registers and access registers 21 for normal macro-code instruction execution and to a set of general purpose registers and access registers 23 for millicode instruction execution. Control logic controls the exchange of data between the two sets of registers when beginning or terminating a millicode routine. Milli-mode detection logic 26 is coupled to the instruction registers and detects when a macro-instruction, which is being decoded, is of a type that is to be interpreted in a milli-mode operation. When this occurs, the milli-mode detection logic 26 generates an entry point address and passes this address along to the instruction fetch control logic 35 and places the decoder 20 into a millimode operating state. In this state the decoder is enabled to decode milli-mode instructions. Milli-mode instructions are vertical microcode, consisting of a mixture of regular microcode instructions and special milli-mode only instructions, all of which can be executed in the execution unit 24. The special instructions provide control functions needed by the millicode routines. The set of millicode routines reside outside of the program addressable storage. The system effects of an executed instruction are architecturally visible in the completion logic 30. Signal lines between the completion logic 30 and the decoder 20 allow the decoder 20 to keep track of instruction completion. A program status word (PSW) in register 31 controls execution of the macro-program. Similarly, the system also includes a milli-PSW register 33, which controls execution of the milli-routine. Both the execution unit 24 and the completion logic 30 are connected to read from/write to the PSW and the milli-PSW registers. Thus, at any given point the execution units or the completion logic can read or update the appropriate one of the PSW and/or milli-PSW registers. A processor state unit 40 maintains the entire updated status of the architected system both in regular mode and milli-mode operation. In the event of a detected error, the processor state unit 40 provides a resource to recreate the status of the system from a check point state in order to allow a retry of the error causing operation. Milli-mode is enabled when the milli-mode detection logic 26 recognizes that the macro-instruction being decoded is to be implemented with millicode. In response to this recognition, the detection logic 26 signals the decoder 20, the instruction fetch controls 35 and register controls in the execution unit 24. In response to the milli-mode recognition signal from the detection logic 26, the decoder 20 suspends macro-mode decoding, the execution unit register control copies the contents of the GPRs 21 to the milli-registers 23 and causes the system to subsequently use the milli-registers 23. The milli-mode detection logic 26 generates a millicode entry point address. The entry point address (generated by the milli-mode detection logic 26) is used by the control logic 35 to address the cache 12. Milli-instructions from the cache are sent to the instruction registers 18 where the decoder 20 decodes them and schedules them for execution. When the processor enters milli-mode, it executes and completes the macro-instructions already in the pipeline conceptually prior to the instruction that caused entry into milli-mode. As the processor completes the macro-instructions, it updates the appropriate GPRs. At the same time, the processor decodes and executes the milli-instructions that implement the macro-instruction that caused entry into milli-mode. At some point the macro-instruction immediately prior to the instruction that caused entry to milli-mode will be indicated completed in the completion logic 30. Only then does the processor begin to complete the milli-instructions. The processor then continues decoding, executing and completing the milli-instructions. Eventually, the detection logic 26 recognizes a millicode END (MEND) milli-instruction. When the detection logic 26 detects a MEND milli-instruction, it causes the processor to cease fetching milli-instructions. Further, when MEND is detected, the detection logic puts the decoder in macro-mode and causes the processor to begin fetching macro-instructions. Millicode explicitly updates all registers, so there is no transfer of register content when going from milli-mode operation to regular operation. Completion of a MEND milli-instruction causes the processor completion logic to begin completing macro-instructions. The processor can also enter milli-mode in response to an interrupt. When the completion logic detects an interrupt, the interrupt priority logic 45 determines that an interrupt is to be serviced and it signals the instruction fetch unit, causing the decoder to initiate milli-mode. The recognition of an interruption condition causes the processor to halt macro-mode execution at the next interruptible point. The interrupt priority logic 45 also generates control inputs which are used by the milli-mode detection logic to generate an entry point address with which to address the cache. These milli-instructions are sent to the instruction registers where the decoder decodes them and schedules them for execution at the appropriate hardware execution elements. The processor proceeds to decode, execute and complete the milli-instruction in the milli-routine for interrupts. Eventually, the decoder recognizes a Mend milli-instruction. This causes the decoder to stop decoding in milli-mode. Depending on whether or not there are additional interrupts that require servicing, the decoder hardware will either redo the interrupt process or return to decoding macro-instructions from the cache. Now, we need not again delineate again here the commands are provided for communications between processors regarding quiesce operations, the Set Quiesce, and the Reset Quiesce in more detail than like the prior U.S. Pat. No. 5,694,617. A Set Quiesce is issued by a processor to indicate that it wants all other processors to enter a "quiesced" state. Reset Quiesce is issued by a processor that has previously issued set quiesce and has now completed the operation for which the quiesced state was required. These commands must include identification (processor number) of the processor sending the command. These are received and processed by all processors in the system as previously described. A milli-mode routine handles a quiesce interrupt, and causes all the processors in the system to enter a quiesced state. A single bit of a millicode control register indicates a quiesced state and drives an output of the processor to indicate the processor is in a quiesced state. The processor receives a signal indicating all processors in the system are in a quiesced state and latches this value. The output of this latch is sent to the processor instruction unit for use as a millicode branch condition. Thus the pipelined multiprocessor, which executes a simple instruction set in a hardware controlled execution unit executes a complex instruction set in a milli-mode architected state with a millicode sequence of simple instructions in the hardware controlled execution unit. For responding to a quiesce request in the multiprocessing system where each of a plurality of processors is capable of generating a quiesce request, the process sets a quiesce request register in each of the plurality of processors to indicate receipt of a quiesce request from one or more of the processors. As each processor in the system responds to this request, it sets the millicode control register bit indicating that it is in the quiesced state, and also resets the latch indicating whether that processor has gone through a retry operation. It then waits for the quiesce request register to be cleared, indicating that all requesting processors have completing the quiesced operations. If said latch indicating a retry operation is not set at that point, the processor resets the register bit indicating it is in the quiesced state and resumes normal operation. If said latch indicating a retry operation is set, then the processor waits for the system quiesced indication to be reset, indicating that at least one other processor has reset its register bit indicating quiesced operation, then resets its own quiesced operation register bit and resumes normal operation. This is the normal quiesce method of millimode operation now.

In accordance with the present invention we introduce controls which allow the CPUs in an ESA/390 system to process the local buffer update portion of IPTE and SSKE operations without waiting for all other processors to reach an interruptible point, and then to continue program execution with minor temporary restrictions on operations until the IPTE or SSKE operation is globally completed. We use the centralized controls in a Storage Control (SC) unit, with each CPU having an interface to the SC. Other control configurations are possible, though some logically centralized control point is required for the invention. In this description, the CPU which is executing the IPTE or SSKE instruction is denoted as $CPU_x$, and other CPUs in the system are denoted $CPU_y$. These designations are arbitrary; any CPU in the system can execute an IPTE or SSKE instruction, and there can be any number of CPUs in the system.

In this invention, a new control state is added in the CPU, in which no operations are allowed which would access any information which is potentially being updated by a system serialization function. For IPTE, this means not performing DAT to access page table entries in storage; For SSKE, this means not accessing any storage keys either to test for access exceptions or to execute an ESA/390 instruction which explicitly accesses a storage key. While in this state, the CPU is allowed only to access its locally buffered copies of this information, with the assumption that the entries affected by the IPTE or SSKE have already been invalidated from the buffer. In the preferred implementation, storage keys are buffered in the TLB, and no distinction is made between the restriction due to an IPTE being in progress and that due to an SSKE being in progress. In other implementations, these could be distinguished, and the restriction could be further qualified by address or other modifiers so as to reduce the impact on CPU operation while in this control state. In this description, this CPU control state is denoted "IPTE/SSKE restricted mode". Note that the ESA/390 architecture allows direct operand references to the page table entry (as opposed to references made in the course of DAT) without regard to the system serialization implied by the IPTE instruction; the system serialization is only with respect to the usage by all CPUs of affected TLB entries, and ESA/390 explicitly states that CPUs other than the one executing the IPTE do not necessarily perform a CPU serialization operation.

Figure 2:
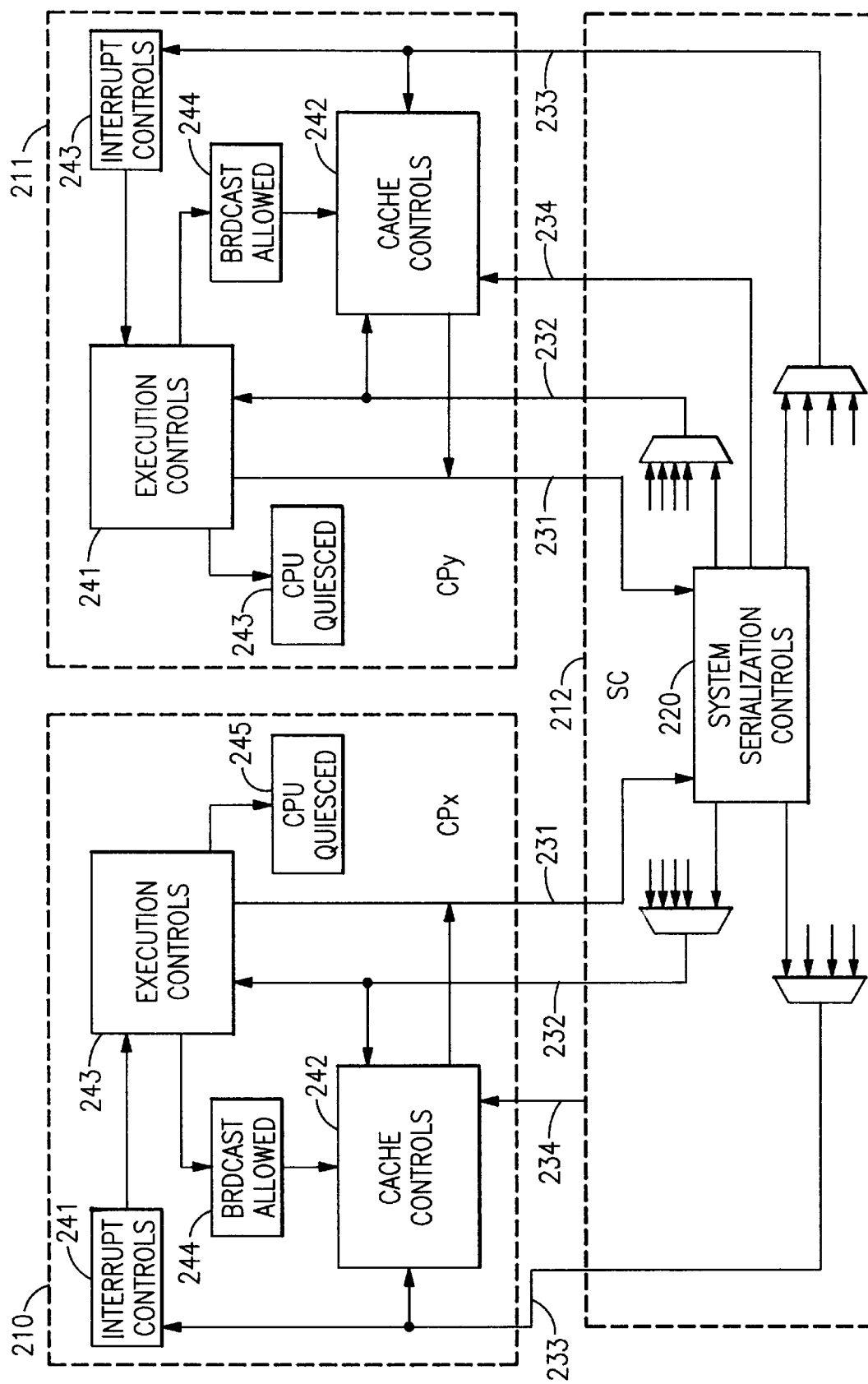
FIG. 2 shows a block diagram illustrating the specific controls associated with the preferred embodiment of our invention

The hardware controls for this invention will now be described with reference to FIG. 2, which illustrates CPUs $CP_x$ 210 and $CP_y$ 211, and storage controller SC 212 A set of serialization controls 220 in the SC insures that only one IPTE or SSKE operation is in progress at one time, and monitors the sequence for that operation. The LIC in each CPU has an interface 231 by which it can send "control" commands to the SC 212 which specify an action to be taken, and also "sense" commands which return information from the SC 212 via a response bus 232. This response bus 232 is also used to communicate command status for "control" commands, and may be set from a plurality of sources within the SC 212 in addition to being set by the system serialization controls 220. Among other things, a CPU can use this interface to sense the state of the system serialization controls in the SC 212. In an IPTE or SSKE sequence, these system serialization controls progress follow the state sequence:

Idle

Broadcast sent

All CPUs started

Idle

This sequence is described in more detail below.

There is also an interface 233 by which the SC can send commands to each CPU; this may be controlled from a plurality of sources within the SC 212, including the system serialization controls 220. The commands sent on this bus include ones which specify that locally buffered information must be invalidated due to an IPTE or SSKE operation. Such commands are typically modified by address information indicating which virtual or real page addresses are affected by the IPTE or SSKE. When such an invalidation command is received by a CPU, it must be held pending until that CPU reaches a point between ESA/390 instructions. In the preferred implementation, these commands are recognized by both the interrupt controls 241 and the cache controls 242 in each CPU. When such a command is pending, the interrupt controls 241 cause an internal interruption to be pending in the CPU, which is taken at the which causes the execution controls 243 to suspend program instruction processing at the next interruptible point (i.e. between ESA/390 instructions, and with no higher-priority interruptions pending). In response to this interruption, the execution controls 243 invoke a LIC routine, which sets a "broadcast operation allowed" latch 244, indicating that it is permissible for the cache controls 242 to process the pending command to invalidate locally buffered information for the IPTE or SSKE. In the preferred implementation, that invalidation takes the form of removing from the TLB any entries affected by the specified IPTE or SSKE.

When $CPU_x$ 210 executes an IPTE or SSKE instruction, it sends an IPTE-Quiesce (IPTEQ) or SSKE-Quiesce (SSKEQ) command to the SC, modified SC 212, modified by the appropriate address information, on interface 231. If the system serialization controls 220 are already busy, the command is rejected via a signal on the SC response bus 232, causing the execution controls 243 to nullify and restart the IPTE or SSKE instruction. (This allows the interrupt for the in-progress IPTE or SSKE to be taken on this CPU.) Otherwise, the SC 212 broadcasts the IPTEQ or SSKEQ command to all CPUs (including CPU$_x$) on interfaces 233 and the system serialization controls 220 move from the "idle" state to the "broadcast sent" state.

Each CPU holds the IPTEQ or SSKEQ request pending in its cache controls 242 until LIC (via the execution controls 243) on the "broadcast operation allowed" latch 244. (In CPU$_x$, this is turned on by the LIC for the IPTE or SSKE instruction, since the interruption is not allowed during an ESA/390 instruction.) The cache controls 242 then initiate the appropriate sequence to remove from the TLB any entries possibly affected by the IPTE or SSKE operation. Also at this time the CPU hardware sends to the SC 212 a command ("broadcast operation started") indicating that it has started processing the IPTEQ or SSKEQ. The system serialization controls 220 in the SC 212 collect the "broadcast operation started" responses from each CPU, and when all CPUs have responded the system serialization controls 220 move from the "broadcast sent" state to the "all CPUs started" state.

Once a given CPU$_y$ 211 has signaled "broadcast operation started", that CPU enters the "IPTE/SSKE restricted mode" of operation. In the preferred implementation, this is accomplished via providing one signal 234 from the SC 212 to each CPU 211 which is active if:

the system serialization controls 220 are in the "broadcast sent" or "all CPUs started" state; and that CPU 211 has signaled "broadcast operation started".

Note that CPU$_x$ 210 does not enter "IPTE/SSKE restricted mode"; this can be accomplished either by blocking the signal 234 from the SC 212 for CPU$_x$ 210 or by having CPU$_x$ 210 ignore this signal 234 based on the fact that an IPTE or SSKE instruction is being executed.

After CPU$_y$ 211 has completed processing the IPTEQ or SSKEQ command, it resumes normal instruction processing at the point of interruption, but in the "IPTE/SSKE restricted mode" of operation. While in this mode, the cache controls 242 block any storage access which requires information which is (or may be) affected by the IPTE or SSKE that is still in progress. In the preferred implementation, any access to translation table or storage key information not found in the TLB is blocked. In other implementations, this restriction could be further qualified by distinguishing between translation table (IPTE) and storage key (SSKE) accesses based on the type of serializing operation in progress. It could also be restricted by storage address or other modifiers associated with the IPTE or SSKE in progress. Various methods are possible for blocking these accesses, including the reporting of a special type of access exception which causes the CPU to re-execute the failing instruction rather than take a program interruption. Once such a storage access is encountered while in "IPTE/SSKE restricted mode," the CPU will not be able to proceed in the program until the signal 234 from the SC 212 indicating this mode becomes inactive.

In CPU$_x$ 210 the LIC for the IPTE or SSKE instruction waits for the system serialization controls 220 to reach the "all CPUs started" state, polling these controls via a sense command to determine the state.

Once this state has been reached, it is known that no CPU can be attempting to use the information which is to be changed. The LIC on CPU$_x$ 210 may then update that information, changing the page table entry in storage or the storage key in the appropriate hardware structure. After completing this update, the LIC on CPU$_x$ 210 sends a command ("broadcast operation complete") to the SC 212. In response to this command, the system serialization controls 220 move from the "all CPUs started" state to the "idle" state. This turns off the signals 234 to all CPUs 211 indicating "IPTE/SSKE restricted mode", allowing all CPUs 211 to resume unrestricted operation. (Alternatively, the SC 212 could forward the "broadcast operation complete" command to all CPUs 211, causing each CPU to turn off its "IPTE/SSKE restricted mode" indication; the former implementation is preferred for reasons having to do with recovery from CPU errors.)

CPU Retry Support

Additional features of this invention allow for CPU retry actions within system serialization operations. For this, it is assumed that the CPU design includes the ability to detect hardware errors, return to a known-good CPU hardware state, and resume processing of LIC or ESA/390 instructions without intervention by the SC or other CPUs. (This set of actions is collectively known as CPU retry.) As part of CPU retry, all information buffered in TLBs is discarded, as being potentially corrupted by the hardware fault that caused CPU retry; this is crucial to the intersection of CPU retry and system serialization functions. It is also assumed here that CPU retry is indicated to the SC by some signaling means; this is generally required anyway in order to "fence" that CPU from the SC during the retry operation.

In general, CPU retry is transparent to the program or LIC being executed at the time. It is possible, however, for a CPU to lose commands sent to it during CPU retry; this includes IPTEQ and SSKEQ commands. In order to allow for this, the system serialization controls 220 must treat a "CPU retry" indication from any CPU$_y$ 211 as if that CPU$_y$ 211 had signaled "broadcast operation started". This is allowable because the CPU retry action is a superset of the partial TLB purge that is required for an IPTEQ or SSKEQ. If CPU$_y$ 211 completes the CPU retry operation before the system serialization function is complete (this is generally unlikely) then CPU$_y$ 211 will be in "IPTE/SSKE restricted mode" following CPU retry until the system serialization function completes.

No additional SC action is required if the CPU which performs retry is CPU$_x$ 210, as the LIC in CPU$_x$ 210 will simply continue with the IPTE or SSKE operation following CPU retry; in this case all other CPUs will be in "IPTE/SSKE restricted mode" for this entire time.

If a CPU encounters a hardware error from which it cannot recover, that CPU enters a check-stopped state, and this is indicated to the SC. The system serialization controls 220 in the SC 212 will consider any checkstopped CPU to have always responded to all IPTEQ or SSKEQ commands immediately. If CPU$_x$ 210 enters the check-stopped state during the system serialization sequence, the system serialization controls 220 move to the "idle" state immediately after they reach the "all CPUs started" state, without waiting for a "broadcast operation complete" signal from CPU$_x$ 210.

In the LIC on CPU$_x$ for IPTE or SSKE, provision must be made for the possibility that CPU retry occurs on that CPU around the time that the IPTEQ or SSKEQ is being sent to the SC. In this case, CPU retry could result in the IPTEQ or SSKEQ being sent twice, with the appearance to the LIC being that the system serialization controls 220 are already busy. To account for this being the cause of a "busy" indication, a command is provided by which the LIC can sense the state of the system serialization controls 220 as well as the CPU identifier for the CPU which has sent the IPTEQ or SSKEQ currently being processed. This can then be compared to the CPU identifier for this CPU to determine whether this is a "false busy" due to CPU retry, in which case the LIC can continue with the IPTE or SSKE sequence. To avoid the overhead of this check for all cases of a "busy" response to an IPTEQ or SSKEQ command, the LIC on $CPU_x$ 210 may make use of a mechanism which indicates whether CPU retry has in fact occurred on this CPU within a given window of time. (See U.S. Pat. No. 5,673,391 "Hardware Retry Trap for Millicoded Processor".)

Intersection with Conventional Quiesce Mechanism

Besides IPTE and SSKE, other operations in an ESA/390 system may at times require that an action appear to happen at a single point in time for all processors regardless of information buffered within the processor. Since these are much less frequent than IPTE and SSKE, the performance associated with the conventional "straightforward" implementation (wait for all CPUs to pause; do the function; release all CPUs) is acceptable, and the complexity associated with the IPTEQ and SSKEQ commands is not justified. In addition, it is at least theoretically possible for one CPU to be consistently prevented from executing an IPTE or SSKE operation due to "busy" indications from the system serialization controls 220, which are due in turn to a dense collection of IPTE and SSKE instructions being executed on other CPUs in the system. In this case, LIC on that CPU can be written to revert to the conventional quiesce sequence to insure that it makes forward progress in its program.

In our preferred embodiment we allow both the conventional and current preferred forms of system serialization to exist at once in the system. The LIC sets a latch 245 indicating that the CP is in a "quiesced" state whenever it sets the "broadcast operation allowed" latch 244 and vice versa. The LIC for IPTE or SSKE waits for any pending conventional quiesce requests to be handled after determining that the system serialization controls 220 are in the "all CPUs started" state, then turns off the "quiesced" latch 245 before updating the translation table or storage key. The LIC which handles quiesce interrupts and conventional quiesce operations turns off the "broadcast operation allowed" latch 244 after turning off the "quiesced" latch 245. In addition, LIC which will perform a conventional quiesce sequence must not start this sequence while the CPU is in "IPTE/ SSKE restricted mode". These changes, together with the fact that only one IPTEQ or SSKEQ operation is allowed to be in progress at one time in the system, insures that both types of system serialization operations are able to complete without any conflict.

System Serialization Control Sequence

Figure 3:
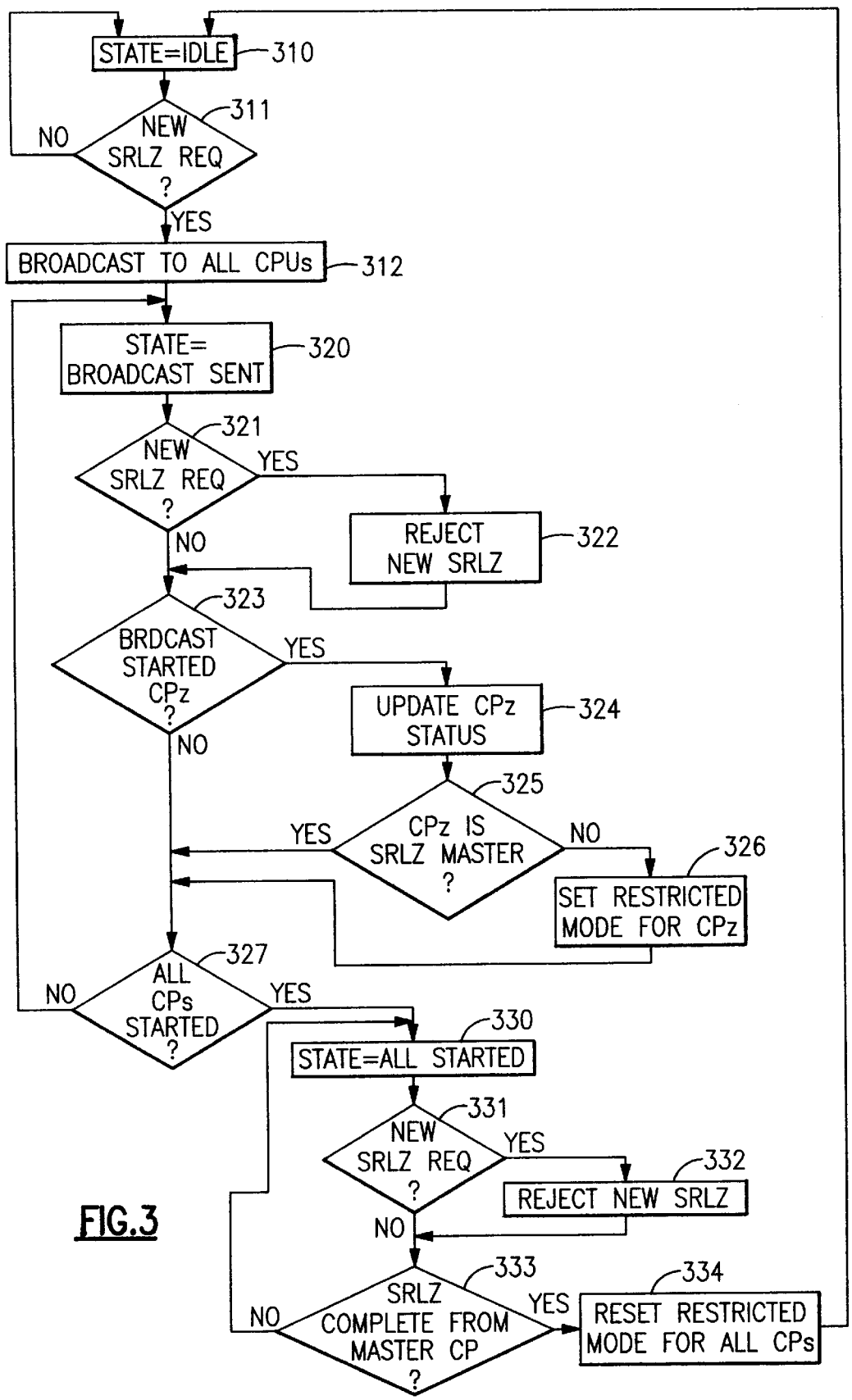
FIG. 3 is a flow diagram of the hardware sequence in the controls of a Storage Controller specific to quiescent operations for Invalidate Page Table Entry (IPTE) and Set Storage Key Extended (SSKE).

The flow diagram in FIG. 3 illustrates the state sequence followed by the system serialization controls 220. These controls being in the IDLE state 310, and monitor the command interfaces 231 from all of the CPUs in the system for a new system serialization request (decision step 311). When such a command is recognized, the system serialization controls 220 broadcast this command (step 312) to all CPUs on command interfaces 233, then enter the BROADCAST-SENT state 320. While in the BROADCAST-SENT state, any new system serialization request (decision step 321) will be rejected via the SC response bus 232 to the CPU from which the new request came (step 322), since only one such request may be in progress at any time. Also while in the BROADCAST-SENT state, the system serialization controls 220 monitor the command interfaces 231 from all of the CPUs for "broadcast operation started" commands. When each such command is recognized (decision step 323) the system serialization state for that CPU is updated (step 324) to reflect this. In addition, if that CPU is not the one which orginally requested the system serialization operation being processed (decision step 325), then the "IPTE/SSKE restricted mode" state is set for that CPU (step 326); this state is reflected back to each CPU via control signal 234. Once a "broadcast operation started" command has been received from each of the CPUs in the system (decision step 327), the system serialization controls 220 enter the ALL CPUs STARTED state 330. While in the ALL CPUs STARTED state, any new system serialization request (decision step 331) will be rejected via the SC response bus 232 to the CPU from which the new request came (step 332), since only one such request may be in progress at any time. Also while in the ALL CPUs STARTED state, the system serialization controls 220 monitor the command interface 231 from the CPU which originally requested the system serialization operation for a "broadcast operation complete" command. When each such command is recognized (decision step 333), the system serialization controls 220 reset the "IPTE/SSKE restricted mode" states for all CPUs (step 334); this state is reflected back to the CPUs via control signals 234. The system serialization controls 220 then return to the IDLE state 310.

Internal Code Sequence

The flow diagram in FIG. 4 illustrates the sequences followed by the Licensed Internal Code (LIC) for a system serialization operation. In the preferred implementation, this LIC is in the form of millicode.

To execute an IPTE or SSKE instruction, the LIC begins at step 400. The LIC waits (decision step 401) until all prior operations are complete in this CPU, then sends a system serialization command to the SC in step 410. The response to this command is analyzed in decision step 411. If the command is rejected because the system serialization controls are already busy, then the LIC nullifies the IPTE or SSKE instruction in step 412 and ends the operation in step 413; this allows the interruption to be taken on this CPU for the system serialization function which is already in progress. If the response indicates that the CPU has gone through a retry operation, the LIC reads the state of the system serialization controls in the SC (step 414) and checks to see if this CPU is in fact the CPU for which those controls are busy (decision step 415); this would be the case if the CPU retry event occurred after sending out the command but before receiving the response from the SC. If this is not the case (i.e. the system serialization controls are not busy or are busy for a different CPU), the LIC returns to step 410 and re-issues the system serialization command to the SC. If the SC response analyzed in step 411 is that the command is accepted, or if it is determined in step 415 that the serialization controls are in fact processing a command from this CPU, then the LIC progresses to the next portion of the sequence.

In step 420, LIC sets both the "broadcast operation allowed" and "CPU quiesced" latches for this CPU. LIC then waits (decision step 421) for the CPU hardware to process the local TLB portion of the IPTE or SSKE operation, as indicated by there no longer being such an operation pending on this CPU. LIC then resets the "broadcast operation allowed" latch (step 422) and begins polling the system serialization controls in the SC, repeatedly reading the status of these controls (step 423) and checking the response (decision step 424) to determine if those controls have entered the "All CPUs Started" state. Once the system serialization controls have reached that state, the LIC performs the global facility update required by the IPTE or SSKE operation (step 425); that is, the page table entry is invalidated in storage (IPTE) or the storage key is updated (SSKE). The LIC then issues a "broadcast operation complete" command to the SC (step 430). If the response from this command indicates that a CPU retry event has occurred (decision step 431), then LIC reads the status of the system serialization controls in the SC (step 432) to determine if the "broadcast operation complete" command actually reached those controls. If the system serialization control status indicates that these controls are still busy with a command for this CPU (decision step 433) then LIC returns to step 430 to re-issue the "broadcast operation complete" command. Once the "broadcast operation complete" command is known to have been accepted (as determined by either of steps 431 or 433), the LIC progresses to step 450.

The next portion of the sequence allows for the possibility that a conventional quiesce request has been received from another CPU while processing the IPTE or SSKE, or that an IPTE or SSKE command has been received from another CPU since the time that this CPU completed its broadcast operation. In step 450, LIC sets "broadcast operation allowed" latch in the CPU, then waits in step 451 until there are no conventional quiesce requests from other CPUs pending in the hardware; once this condition is met, LIC resets the "CPU quiesced" latch for this CPU in step 452. In step 453, LIC waits until there are no IPTE or SSKE serialization requests pending in the hardware; once this condition is met, LIC resets the "broadcast operation allowed" latch for this CPU in step 454. In step 460, LIC checks to see whether a CPU retry event has occurred during this part of the sequence. If so, LIC sets the "CPU quiesced" latch for this CPU (step 461) and then waits in step 462 for some other CPU in the system to exit the quiesced state, as indicated by the whole system no longer being quiesced; LIC then resets the "CPU quiesced" latch (step 463) and continues to step 470. This insures that the first CPU to leave the quiesced state is one that is not subject to having lost quiesce requests due to CPU retry. If no CPU retry in detected in step 460, LIC proceeds directly to step 470. In step 470, LIC tests once more for any conventional quiesce requests which may have been received from other CPUs. If any are present, LIC returns to step 442 to repeat the quiesce receiver sequence; otherwise LIC terminates the IPTE or SSKE operation in step 480.

To handle an interruption due either to an IPTE or SSKE system serialization or to a conventional quiesce request, LIC begins at step 440. In step 441, LIC waits for all prior operations on this CPU to be complete, then sets the "CPU quiesced" latch in step 442 and sets the "broadcast operation allowed" latch in step 450. From this point on, the sequence is the same as that described above starting in step 450.

Note that our multiprocessor system serialization controller signals the processor which made the global resource update request when all processors have responded to the broadcast global resource update request. Once a receiving processor starts working on one of the broadcast operations, it is guaranteed by design that it will not do any instructions until it has finished. Thus although in a real-time since the response is that it has "started" the operation, in a logical sense that is equivalent to it having "done" the operation. Of course, as an alternative, a signal could be sent within the context of the system serialization controller signaling the processor which made the global resource update request when all processors have completed processing the broadcast global resource update request. This signal in our preferred embodiment is of acceptance of the request which encompasses the completion of the task.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A method for system serialization of a multiprocessor system which executes a simple instruction set in a hardware controlled execution units and executes a complex instruction set in a Licensed Internal Code (LIC) architected state with a LIC sequence in the hardware controlled execution units, said system having a plurality of processors each of which executes instructions from said simple instruction set from said complex instruction set in a Licensed Internal Code (LIC) architected state with a LIC sequence in a hardware controlled execution unit, and wherein said method for system serialization includes the steps of: each of said processors generating and responding to system quiesce requests and requests to perform updates of global resources, and wherein during processing said system quiesce requests and said requests to perform updates are buffered in one or more of said plurality of processors, and a system operation control, using a storage controller and a system serialization controller, directs said updates of global resources, and said system operation control includes storage for Licensed Internal Code (LIC) sequences which allow global resource update operations to co-exist with other operations which require system quiescing for all processors to pause together, and to allow for CPU retry actions on any of the CPUs in the system at any point in the operation.

2. A method as in claim 1 wherein said directed global resources include direction of address translation table entries and storage protection keys.

3. A method as in claim 2 wherein said system serialization controller receives from each processor requests in order to perform updates of global resources, and responds to each such request either by indicating that the system serialization controller is busy or by broadcasting the global resource update request to all processors in the system.

4. A method as in claim 3 wherein each processor which receives a broadcast global resource update request suspends instruction processing at an interruptible point, and responds to the system serialization controls that the request has been accepted, processes the requested global resource update by modifying or invalidating any local copies of the resource being updated, and resumes instruction processing at the point of interruption.

5. A method as in claim 4 wherein said system serialization controller causes each processor which has responded to a broadcast global resource update request, except for the processor which made the global resource update request, to enter a restricted control state wherein access to the global resource being updated is inhibited.

6. A method as in claim 5 wherein said system serialization controller signals the processor which made the global resource update request when all processors have responded to the broadcast global resource update request.

7. A method as in claim 6 wherein said requesting processor then modifies the global resource, then signals the system serialization controller that the global resource update operation is complete.

8. A method as in claim 7 wherein said system serialization controller causes all processors to leave said restricted control state, allowing all processors to access the updated global resource as needed.

9. A method according to claim 8 wherein said system operation control includes storage for Licensed Internal Code (LIC) sequences which allow global resource update operations to co-exist with other operations which require system quiescing for all processors to pause together, and to allow for CPU retry actions on any of the CPUs in the system at any point in the operation.

10. A method according to claim 1 wherein the system operation control includes a storage controller and a local buffer for Invalidate Page Table Entry (IPTE) and Set Storage Protection Key (SSKE) operations for each processor.

11. A method according to claim 10 wherein the global resource update request broadcast to all processors sets the processor in a IPTE/SSKE restricted mode for IPTE and SSKE operations and entering a broadcast sent state prevents subsequent request commands from proceeding until said new system serialization request command is fully processed.

12. A method for system serialization of a multiprocessor system which executes a simple instruction set in a hardware controlled execution units and executes a complex instruction set in a Licensed Internal Code (LIC) architected state with a LIC sequence in the hardware controlled execution units, said system having a plurality of processors each of which is part of said multiprocessing system and capable of generating and responding to a quiesce request, and system operation control including a storage controller and local buffer for IPTE (Invalidate Page Table Entry) and SSKE (Set Storage Key Extended) operations for each processor, said steps including activating system serialization controls from an idle state with a new system serialization request command sent from one of said processors, and broadcasting the request command to each of said processors and setting a IPTE/SSKE restricted mode for IPTE and SSKE operations and entering a broadcast sent state preventing subsequent request commands from proceeding until said new system serialization request command is fully processed, monitoring with said system serialization controls when each processor has started operations in response to said new system serialization request, and when all processors have started operations said system serialization controls monitors the one processor which originally sent the new system serialization request command for a broadcast operation complete command, whereupon said system serialization controls reset said IPTE/SSKE mode and return to the idle state, wherein each of said processors process a local buffer update portion of IPTE and SSKE operations without waiting for all other processors to reach an interruptable point, and then continues program execution with minor temporary restrictions on operations until the IPTE or SSKE operation is globally completed.

13. A method according to claim 12 wherein said multiprocessor system executes Licensed Internal Code (LIC) sequences which allow IPTE and SSKE operations to co-exist with other operations which require system quiescing for all processors to pause together, and allow for CPU retry actions on any of the CPUs in the system at any point in the operation.

* * * * *